(12) United States Patent
Couture et al.

(10) Patent No.: US 9,847,926 B2
(45) Date of Patent: Dec. 19, 2017

(54) PRESENTING APPLICATION PERFORMANCE MONITORING DATA IN DISTRIBUTED COMPUTER SYSTEMS

(71) Applicant: Teachers Insurance and Annuity Association of America, New York, NY (US)

(72) Inventors: Gary Robert Couture, Hollis, NH (US); Mathew Wade Pickering, Port Orange, FL (US); Ethan Luke Michaud, Harrisburg, NC (US); Latrisha Devon Whitehead, Charlotte, NC (US); Andrew Eugene Kettering, Westford, MA (US); Scott Matthew Blandford, Hopewell, NJ (US); Rafael Pedro Olaso, Mendon, MA (US); LeeAnn Marie Flanagan, Medway, MA (US); Elizabeth Anne MacDonald, Schenectady, NY (US); William V. Arneth, III, Westborough, MA (US); Ryan Matthew Wiesman, Wausau, WI (US); Scott James Danesi, Concord, NC (US); Thomas Steven Joyce, Washington, DC (US); Jennifer D'awn Jeffress, Bailey, CO (US); Eddie Gordon Finch, Jr., Cornelius, NC (US); Matthew M. Bechard, Forestdale, MA (US); Nathaniel J. Bates, Portsmouth, NH (US); Edmund Martin Prout, Merrimack, NH (US); Devesh Patel, Waxhaw, NC (US); Jakkinpali Murty, Harrisburg, NC (US); Kristopher C. Krug, Matthews, NC (US); Daniel Joseph Healy, Jr., Dudley, MA (US); Omar C. Saxton, Charlotte, NC (US); Kevin M. McGill, Mansfield, MA (US)

(73) Assignee: Teachers Insurance and Annuity Association of America, New York, NY (US)

(*) Notice: Subject to any disclaimer, the term of this patent is extended or adjusted under 35 U.S.C. 154(b) by 352 days.

(21) Appl. No.: 14/687,352

(22) Filed: Apr. 15, 2015

(65) Prior Publication Data
US 2016/0308745 A1 Oct. 20, 2016

(51) Int. Cl.
*G06F 15/16* (2006.01)
*H04L 12/26* (2006.01)
(Continued)

(52) U.S. Cl.
CPC .............. *H04L 43/10* (2013.01); *H04L 67/10* (2013.01); *H04L 67/1097* (2013.01); *H04L 67/42* (2013.01)

(58) Field of Classification Search
CPC ..... H04L 41/0631; H04L 43/00; H04L 43/16; H04L 43/08; H04L 41/046; H04L 43/045
See application file for complete search history.

(56) References Cited

U.S. PATENT DOCUMENTS

| | | | |
|---|---|---|---|
| 8,584,128 B1* | 11/2013 | Don | G06F 9/5011 718/100 |
| 2002/0120727 A1* | 8/2002 | Curley | H04L 41/12 709/223 |

(Continued)

OTHER PUBLICATIONS

PROTECTWISE™ Security Enlightened, "PROTECTWISE™ Cloud Network DVR", https://s3.amazonaws.com/www.protectwise.com/u/107/original/final-pw-datasheet-v3.pdf, 2 pages, Last accessed on [Mar. 28, 2016].

(Continued)

*Primary Examiner* — David Lazaro
(74) *Attorney, Agent, or Firm* — Lowenstein Sandler LLP (57) ABSTRACT

Systems and methods for presenting application performance monitoring data in distributed computer systems. An example method may comprise: receiving, by a processing device, one or more application performance monitoring (APM) rules, each APM rule determining an application operational status based on one or more APM parameters; receiving APM data comprising a plurality of APM data
(Continued)

items representing values of the APM parameters of a software application; determining an operational status of the software application by applying the APM rules to the APM data; and causing the operational status to be visually represented via a graphical user interface (GUI).

20 Claims, 5 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2003/0135382 A1* | 7/2003 | Marejka | G06F 11/0709 709/232 |
| 2003/0212788 A1* | 11/2003 | Wilding | G06F 11/0715 709/224 |
| 2005/0086342 A1* | 4/2005 | Burt | H04L 41/0663 709/224 |
| 2008/0134046 A1* | 6/2008 | Gray | G06F 11/328 715/736 |
| 2008/0281607 A1* | 11/2008 | Sajja | G06Q 10/06 705/1.1 |
| 2010/0228851 A1* | 9/2010 | Francis | H04L 41/5009 709/224 |
| 2011/0078298 A1* | 3/2011 | Sakai | G06F 11/0709 709/223 |
| 2015/0029193 A1* | 1/2015 | Krajec | G06T 11/206 345/440 |
| 2015/0135325 A1 | 5/2015 | Stevens et al. | |
| 2015/0244678 A1 | 8/2015 | Stevens, IV et al. | |

OTHER PUBLICATIONS

Report Reprint, "ProtectWise raises $20m series B to advance its futuristic security platform", https://s3.amazonaws.com/www.protectwise.com/u/182/original/451-impact-report-protectwise-raises-%2420m-series-b-to-advance-its-futuristic-security-platform.pdf, 5 pages, Dec. 1, 2015.
Nather, Wendy; Sanabria, Adrian, 451 Research, "ProtectWise's cloud-based network DVR for security, with echoes of TRON", https://s3.amazonaws.com/www.protectwise.com/u/183/original/451-research-report-protectwises-cloud-based-network-dvr-for-security-with-echoes-of-tron.pdf, 5 pages, May 29, 2015.
Palmer, Tony, et al., ESG Lab Spotlight, "ProtectWise: Shifting Network Security to the Cloud", https://s3.amazonaws.com/www.protectwise.com/u/70/original/esg-lab-spotlight.pdf, 5 pages, Mar. 2015.
PROTECTWISE™ Security Enlightened, "ProtectWise Advanced Trust, Security and Privacy by Design", https://s3.amazonaws.com/www.protectwise.com/u/49/original/protectwise-trust-security-privacy-whitepaper.pdf, 6 pages, Last accessed on [Mar. 28, 2016].
PROTECTWISE™ Security Enlightened, "ProtectWise Security Enlightened™" Defense in Depth? More Like Defence in Doubt™, https://s3.amazonaws.com/www.protectwise.com/u/83/original/protectwise-solutionsbrief-securityenlightened.pdf, 4 pages, 2015.

* cited by examiner

PRESENTING APPLICATION PERFORMANCE MONITORING DATA IN DISTRIBUTED COMPUTER SYSTEMS

TECHNICAL FIELD

The present disclosure is generally related to distributed computer systems, and is more specifically related to application performance monitoring in distributed computer systems.

BACKGROUND

A distributed computer system may comprise one or more components, including, e.g., web servers, application servers, database servers, and/or various other components. A plurality of clients may access the servers of the distributed computer system via a network comprising one or more local area networks and/or one or more wide area networks (e.g., the Internet). Performance and availability of the applications delivered by the distributed computer system may be monitored by an application performance monitoring (APM) system that may collect, store, and process the data reflecting multiple performance and availability parameters of one or more components of the distributed computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for presenting application performance monitoring (APM) data in distributed computer systems.

In the below description and examples, references are made to Open Systems Interconnection (OSI) model layers, including data link layer (layer 2) and network (layer 3), as defined by Recommendation X.200 (July 1994) by International Telecommunications Union (ITU). The data link layer provides local delivery of frames (i.e., units of transmission including a link-layer header followed by a data packet) between devices on the same local area network (LAN). Functions of data link layer protocols include local delivery, addressing, and media arbitration. Examples of data link protocols include Ethernet, Infiniband, and Wi-Fi. The network layer provides the functional and procedural means of transferring variable-length data sequences from a source to a destination host via one or more networks, while maintaining the quality of service functions. Functions of network layer protocols include host addressing and message forwarding.

"Application performance monitoring" herein refers to monitoring of multiple performance metrics of software applications being executed by distributed computer systems. The application performance metrics may include various real-time and/or aggregated metrics reflecting the service operational status and/or specific performance parameters of software applications comprised by the service. The application performance metrics may further include various end user experience (EUE) metrics, such as the request processing time (e.g., measured as the page load time), and/or the number of server errors received in response to the client requests. "Failed customer experience" herein refers to a subset of EUE metrics that reflect the impact of various types of errors (including system, application, performance, and service availability errors) upon the end users of a distributed computer system.

In accordance with one or more aspects of the present disclosure, an APM data collection and presentation server (hereinafter referred to as "APM server") of a distributed computer system may be configured to receive, via a communication interface, one or more APM rules determining an application operational status based on one or more APM parameters.

The APM server may then receive, via a communication interface, APM data comprising a plurality of APM parameter values reflecting performance of a software application. Various APM data items may be produced by APM agents installed on the application servers and configured to transmit logging messages to the APM servers. Certain APM data items may be produced by APM agents employed to perform active application testing. Also, certain APM data items may be received from a device configured to intercept network traffic (e.g., a port mirroring device or a network traffic sniffer). In certain implementations, an APM data item may reflects the performance of a certain functional point of the application, as described in more details herein below.

The APM server may apply the APM rules to the received APM data to determine the real-time operational status of the application. In certain implementations, a set of critical functional points (CFPs) may be defined for each application being monitored. "CFP" herein shall refer to an arbitrarily designated functional point of an application (such as a web page), the performance of which may be tested independently of other functional points of the application, e.g., by inspecting the application's response to a request (e.g., a probe request or a client-initiated request) addressed to the CFP.

In an illustrative example, the application operational status may be characterized as "normal" responsive to determining that an average application response time does not exceed a first threshold value (e.g., the Service Level Agreement (SLA) performance). In another illustrative example, the application operational status may be characterized as "slow performing" responsive to determining that an average application response time exceeds a second threshold value (e.g., the SLA performance multiplied by a certain coefficient). In another illustrative example, the application operational status may be characterized as "application error" or "system error" responsive to detecting a certain byte pattern within at least one APM data item. In another illustrative example, the application operational status may be characterized as "critical error" responsive to detecting at least a threshold number of errors corresponding to a certain CFP within a certain period of time. In another illustrative example, the application operational status may be characterized as "no data available" responsive to determining that no APM data items have been received for the application within a certain period of time. In another illustrative example, the application operational status may be characterized as "service not available" responsive to determining that one or more APM data items indicate at least a certain number of failed attempts to perform a certain application function (e.g., user login).

The distributed computer system may employ one or more APM data visualization clients to represent the application operational status via a graphical user interface (GUI). In an illustrative example, an APM data visualization client may represent, in a visual relationship to a timeline, a plurality of values of the operational status corresponding to a plurality of periods of time.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
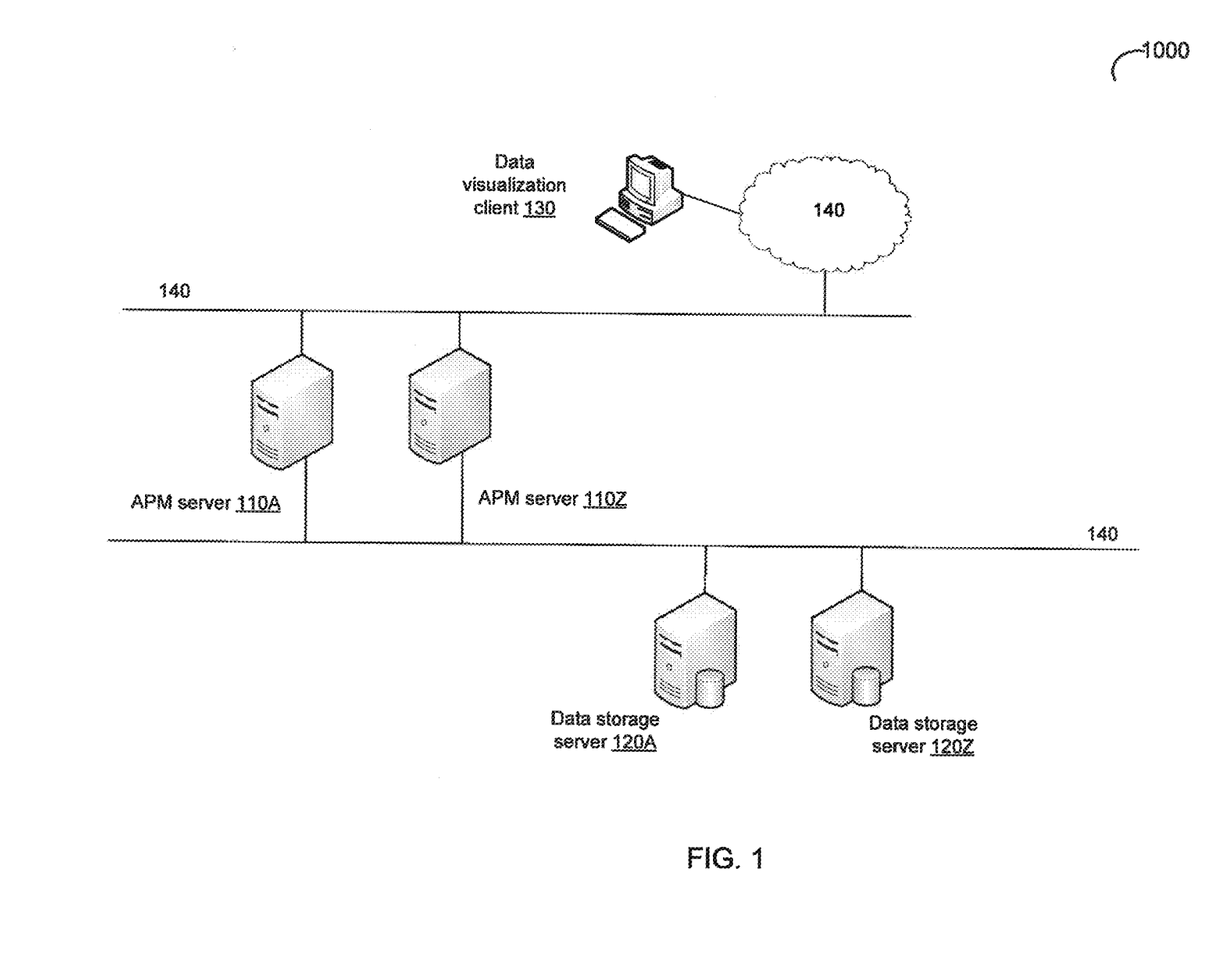
FIG. 1 schematically illustrates a high-level network diagram of an example distributed computer system that may implement the methods for presenting application performance monitoring (APM) data in distributed computer systems, in accordance with one or more aspects of the present disclosure.

FIG. 1 schematically illustrates a high-level network diagram of an example distributed computer system 1000, which may implement the methods for presenting APM data in distributed computer systems in accordance with one or more aspects of the present disclosure. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems described herein for presenting APM data in distributed computer systems.

Example distributed computer system 1000 may comprise one or more data collection and presentation servers 110A-110Z (hereinafter referred to as "APM servers"), which may be configured for implementing the methods for presenting APM data in distributed computer systems in accordance with one or more aspects of the present disclosure. In certain implementations, distributed computer system 1000 may further comprise one or more data storage servers 120A-120Z, which may be configured to store various APM data related to one or more software applications. Data storage servers 120A-120Z may be provided by file or block-level storage, relational databases, and/or data storage devices or systems of various other types.

Example distributed computer system 1000 may further comprise one or more data visualization clients 130, which may be configured to receive application operational status and other APM data from APM servers 110A-110Z in order to present the data via a graphical user interface (GUI), as described in more details herein below.

APM servers 110A-110Z, data visualization client 130, and other components of example distributed computer system 1000 may be interconnected by one or more networks 140, which may comprise one or more local area networks and/or one or more wide area networks. Firewalls, load balancers, network switches and various other networking components may be omitted from FIG. 1 for clarity.

In certain implementations, one or more APM servers 110A-110Z and/or other components of example distributed computer system 1000 may be communicatively coupled (e.g., via one or more networks) to one or more servers executing one or more software applications being monitored (not shown in FIG. 1) in order to automatically collect raw APM data, as described in more details herein below.

The above described architecture of distributed computer system 1000 serves as an illustrative example only and does not in any way limit the scope of the present disclosure. Various other system architectures may be compatible with the methods and systems for determining software testing project status indicators in accordance with one or more aspects of the present disclosure.

In accordance with one or more aspects of the present disclosure, an APM server of a distributed computer system may be configured to receive one or more APM rules determining an application operational status based on one or more APM parameters.

In certain implementations, an APM rule may be represented by a conditional statement including one or more logical conditions and at least one value of the application operational status corresponding to a certain result (e.g., true or false) of evaluating the logical conditions. A logical condition may comprise one or more APM parameter values and/or one or more pre-defined and/or dynamically calculated (i.e., at run-time) threshold values against which the APM parameter values are compared by one or more arithmetical or logical operations.

Further in accordance with one or more aspects of the present disclosure, one or more APM servers 110A-110Z may receive raw APM data reflecting various aspects of application performance. In an illustrative example, a plurality of APM data items may be produced by one or more APM agents installed on the application servers and configured to transmit logging messages to APM servers 110A-110Z. In certain implementations, the logging message transmission may occur over a dedicated connection to APM server 110, in order to enable the real-time APM data collection and subsequent processing. A logging message may comprise one or more incoming application layer messages and/or one or more outgoing application layer messages associated with one or more application-level transactions. The term "transaction" herein refers to a sequence of messages flowing between various components of a distributed computer system. Such a sequence may be triggered by a particular user action (e.g., requesting an object identified by a uniform resource identifier (URI) or submitting an HTML form).

In another illustrative example, a plurality of APM data items may be produced by one or more active monitoring agents, which may be configured to periodically transmit certain probe messages to the application servers. The APM data produced by an active monitoring agent may comprise a copy of a probe message, a copy of an application level response message, and/or values of certain aggregated metrics reflecting the service operational status and/or specific performance parameters of software applications comprised by the service (e.g., the average application response time, the average message roundtrip time, the number of application level errors within a certain period of time, etc.).

In another illustrative example, a plurality of APM data items may be produced by one or more network devices, such as data link layer switches and/or network layer routers, capable of performing port mirroring. In an illustrative example, data link layer port mirroring may involve sending, to APM servers 110A-110Z and/or APM data storage server 120A-120Z, copies of network packets seen on one or more switch ports that are connected to the application servers.

In another illustrative example, a plurality of APM data items may be produced by one or more devices, such as network sniffers, capable of intercepting the network traffic. In an illustrative example, intercepting network traffic may involve sending a copy of intercepted network packets to APM servers 110A-110Z and/or APM data storage servers 120A-120Z.

In certain implementations, in addition to or instead of the above described APM data collection methods, various other APM data collection methods may be implemented by distributed computer system 1000.

Further in accordance with one or more aspects of the present disclosure, APM server 110 may be configured to apply certain APM rules to the received APM data, in order to determine the application operational status. In certain implementations, APM server 110 may determine the application operational status in real time, and cause the operational status to be displayed by data visualization client 130, as described in more details herein below.

In certain implementations, APM server 110 may, in accordance with an example APM rule, responsive to determining that an average application response time does not exceed a first pre-defined or dynamically calculated threshold value (e.g., the SLA performance), characterize the application operational status as "normal."

In certain implementations, APM server 110 may, in accordance with another example APM rule, responsive to determining that an average application response time exceeds a second pre-defined or dynamically calculated threshold value (e.g., the SLA performance or the SLA performance multiplied by a certain coefficient), characterize the application operational status as "slow performing."

In certain implementations, APM server 110 may, in accordance with another example APM rule, responsive to determining that a certain byte pattern is present within at least one APM data item, characterize the application operational status as "application error" or "system error." In certain implementations, responsive to detecting the word "error" (case insensitive) within the path string of a Universal Resource Identifier (URI) (URIPath) comprised by an application layer message or within the query string of the URI (URIQueryString), APM server 110 may identify an application error. In another illustrative example, responsive to detecting a status code starting with the character "5" within a HTTP response status string comprised by an application layer message, APM server 110 may identify a system error.

In certain implementations, APM server 110 may, in accordance with another example APM rule, responsive to detecting at least a threshold number of errors corresponding to a certain CFP within a certain time period, characterize the application operational status as "critical error."

In certain implementations, APM server 110 may, in accordance with another example APM rule, responsive to determining that no APM data items have been received for the application within a certain period of time, characterize the application operational status as "no data available."

In certain implementations, APM server 110 may, in accordance with another example APM rule, responsive to determining that one or more APM data items indicate at least a certain number of failed attempts to perform a certain application function (e.g., user login), characterize the application operational status as "service not available."

In certain implementations, APM server 110 may comprise a filtering logic configured to prevent false positive error identifications. In an illustrative example, the filtering logic may be configured to prevent false positive error identification with respect to one or more valid URIs comprising the word "error." In an illustrative example, the filtering logic may be configured to prevent false positive error identification with respect to transactions associated with certain user accounts employed by automated testing processes.

In certain implementations, APM server 110 may further comprise a filtering logic configured to prevent multiple error identifications with respect to a common transaction and/or a common user identifier.

The above described APM rules serve as illustrative examples only and do not in any way limit the scope of the present disclosure. Various other APM rules may be compatible with the methods and systems for presenting application performance monitoring data in distributed computer systems. In various illustrative examples, the above described and/or other APM rules may be configured via a GUI and/or received via an administrative application programming interface (API) of one or more APM servers 110A-110Z.

As noted herein above, APM server 110 may be configured to apply certain APM rules to the received APM data, in order to determine the application operational status. In certain implementations, APM server 110 may determine the application operational status in real time, and cause the operational status to be displayed by data visualization client 130.

Figure 2A:
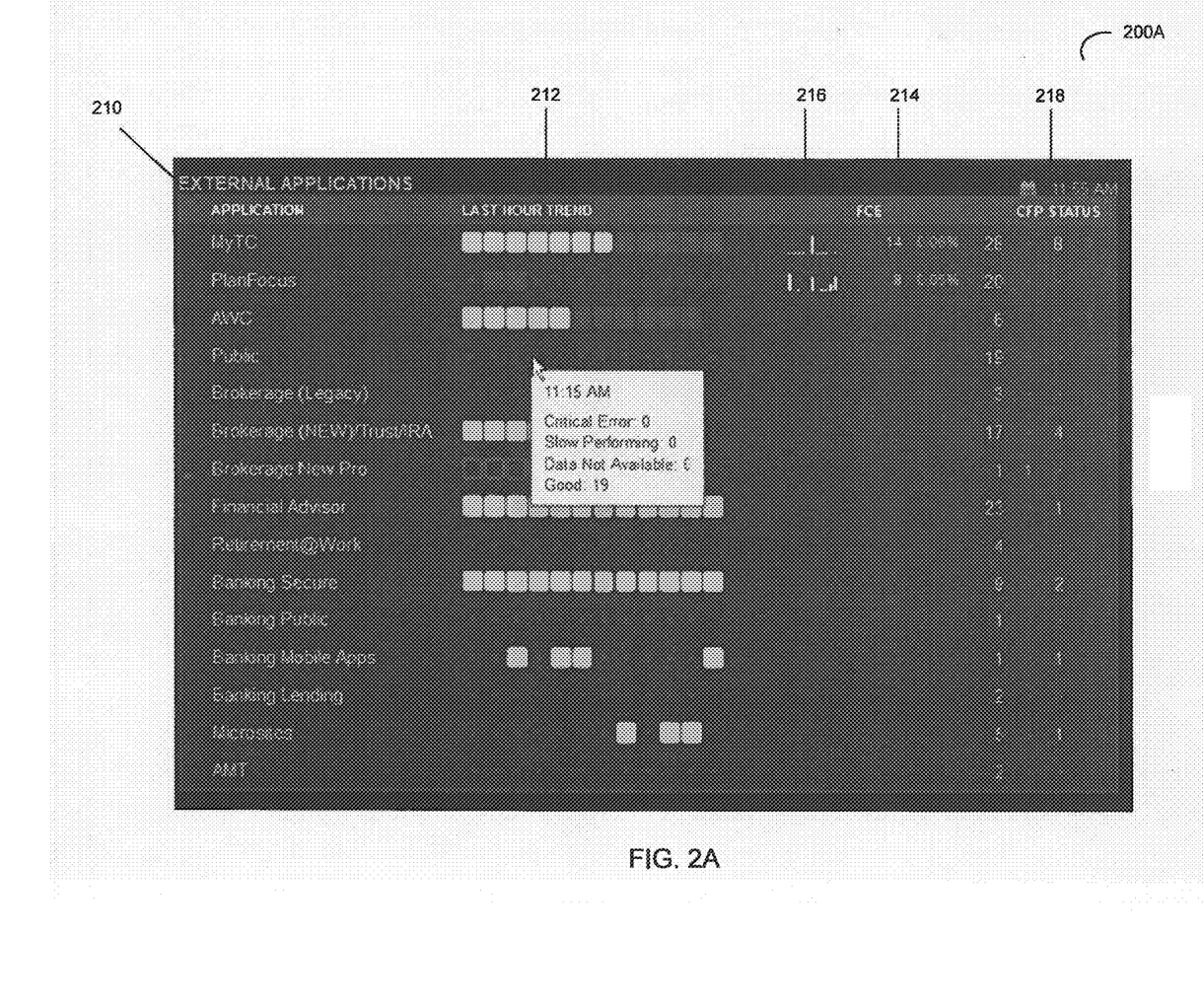
FIGS. 2A-2B schematically illustrate examples of graphical user interface (GUI) screens employed for presenting APM data in distributed computer systems, in accordance with one or more aspects of the present disclosure.

FIG. 2A schematically illustrates an example of data presentation GUI employed by distributed computer system 1000 for presenting APM data in distributed computer systems, in accordance with one or more aspects of the present disclosure. Data presentation screen 200A comprises a list of applications 210 that are being monitored by APM servers 110A-110Z. For each application, data presentation screen 200A comprises a plurality of operational status indicators 212 corresponding to a plurality of time periods (e.g., 5 minutes) within a certain time window (e.g., the last hour). Operational status indicators 212 may use different colors, greyscale steps, and/or shapes for representing various operational status values (e.g., "normal," "slow performing," "application error," "critical error," "no data available," and/or "service not available"). In certain implementations, data presentation screen 200A may further comprise a counter 214 and/or a bar chart 216 of failed customer experience (FCE) events associated with each application. In certain implementations, data presentation screen 200A may further comprise counters 218 of CFPs grouped by status (e.g., "normal," "slow performing" and "critical error") associated with each application.

Figure 2B:
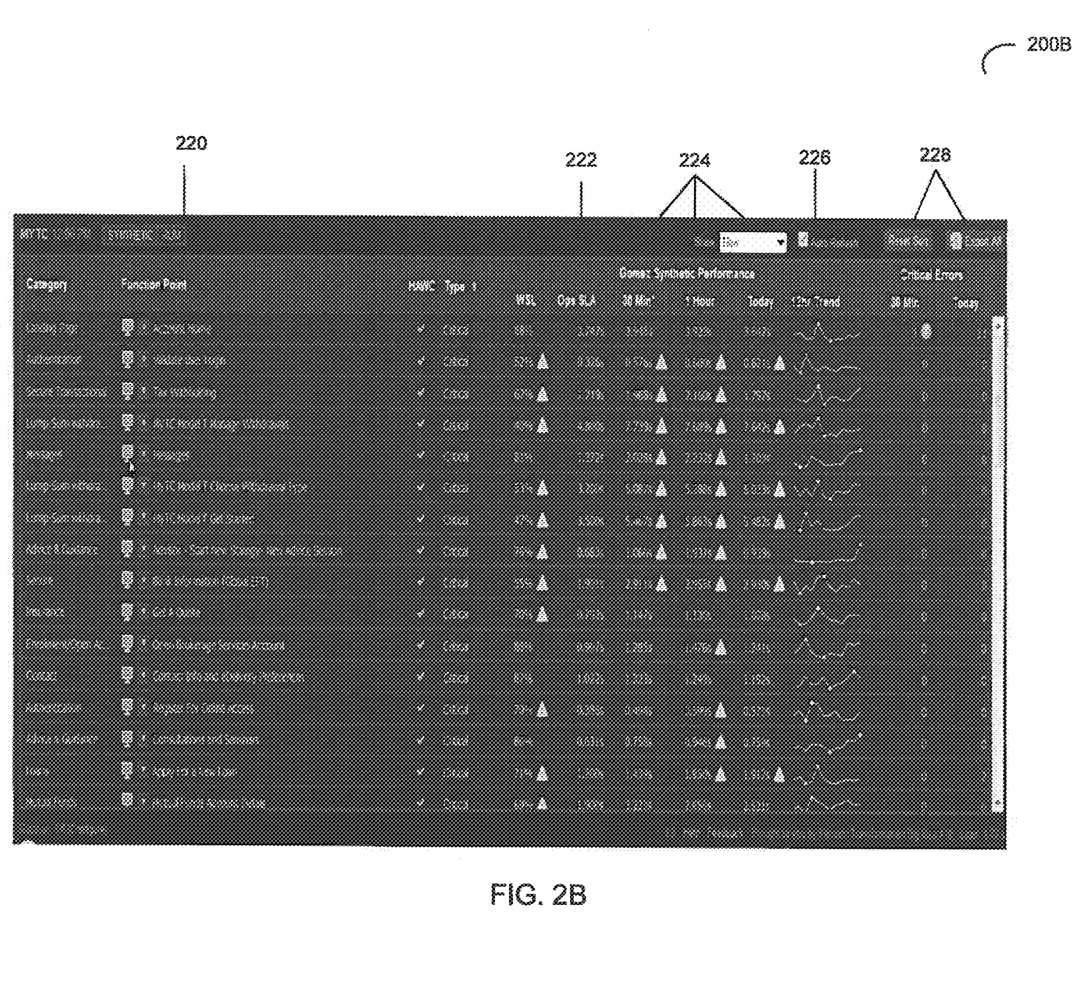

FIG. 2B schematically illustrates another example of data presentation GUI employed by distributed computer system 1000 for presenting APM data in distributed computer systems, in accordance with one or more aspects of the present disclosure. Data presentation screen 200B comprises a list of CFPs 220 associated with an application. For each CFP, data presentation screen 200B comprises the SLA response time 222 and one or more values of average measured response times 224 within a certain timeframe (e.g., within the last 30 minutes, within the last hour, and within the current day). In certain implementations, data presentation screen 200B may further comprise a graph 226 representing the average measured response times. In certain implementations, data presentation screen 200B may further comprise one or more counters 228 of critical errors within a certain timeframe (e.g., within the last 30 minutes and within the current day).

The above described data presentation screens serve as illustrative examples only and do not in any way limit the scope of the present disclosure. Various other data presentation screens may be compatible with the methods and systems for presenting application performance monitoring data in distributed computer systems.

Figure 3:
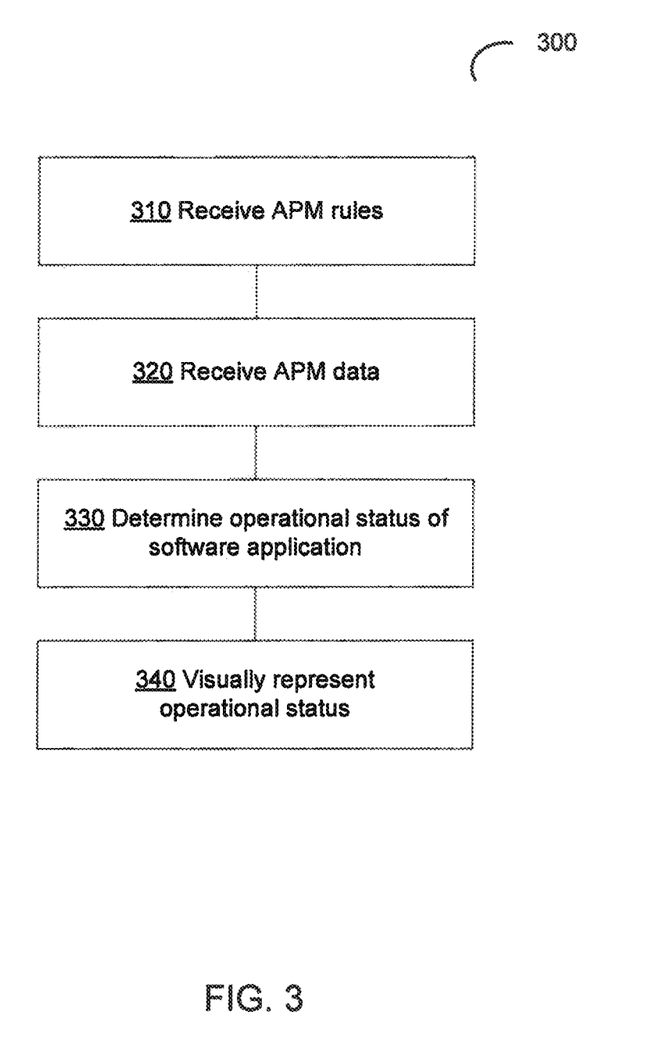
FIG. 3 depicts a flow diagram of an example method for presenting APM data in distributed computer systems, in accordance with one or more aspects of the present disclosure.

FIG. 3 depicts a flow diagram of an example method 300 for presenting application performance monitoring data in distributed computer systems, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, the processing device implementing the method may receive, via a communication interface, one or more APM rules. In certain implementations, an APM rule may be represented by a conditional statement including one or more logical conditions and at least one value of the application operational status corresponding to a certain result (e.g., true or false) of evaluating the logical conditions. A logical condition may comprise one or more APM parameter values and/or one or more pre-defined and/or dynamically calculated (i.e., at run-time) threshold values against which the APM parameter values are compared by one or more arithmetical or logical operations, as described in more details herein above.

At block 320, the processing device may receive APM data comprising a plurality of APM data items representing values of the APM parameters of a software application. Various APM data items may be produced by APM agents installed on the application servers and configured to transmit logging messages to the APM servers. Certain APM data items may be produced by APM agents employed to perform active application testing. Also, certain APM data items may be received from a device configured to intercept network traffic (e.g., a port mirroring device or a network traffic sniffer). In an illustrative example, an APM data item may comprise an application response message associated with a client request message originated by a client computer system. In an illustrative example, an APM data item may reflect the performance of a certain functional point of the application, as described in more details herein above.

At block 330, the processing device may determine an operational status of the software application by applying the APM rules to the APM data. In various illustrative examples, the operational status may be characterized as "normal," "slow performing," "application error," "critical error," "no data available," or "service not available," as described in more details herein above.

At block 340, the processing device may cause the operational status to be visually represented via a graphical user interface (GUI), as described in more details herein above with references to FIGS. 2A-2B.

Figure 4:
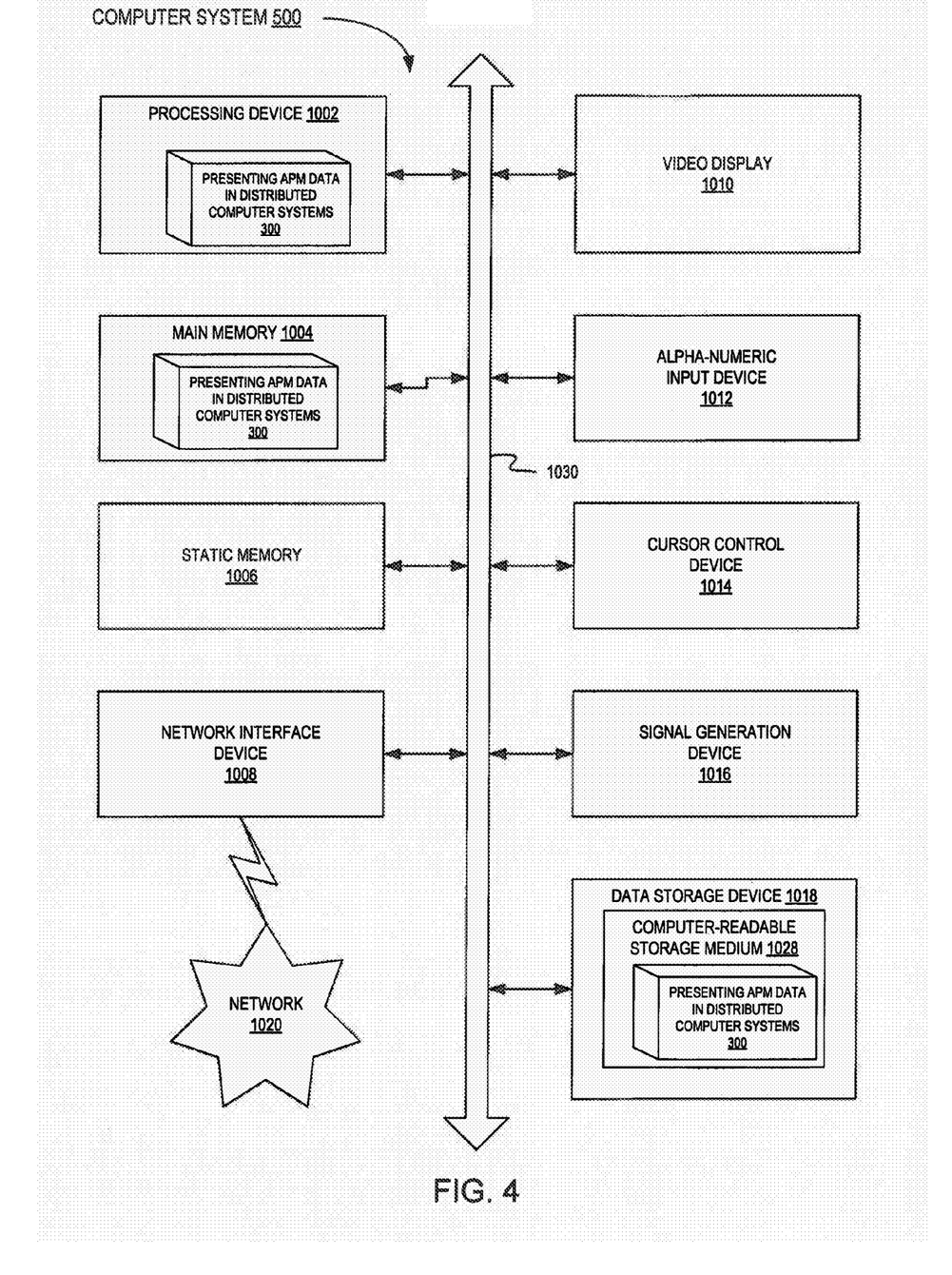
FIG. 4 depicts a block diagram of an illustrative computing system operating in accordance with one or more aspects of the present disclosure.

FIG. 4 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 300 for presenting application performance monitoring data in distributed computer systems.

The example computer system 500 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the method 300 for presenting application performance monitoring data in distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for presenting application performance monitoring data in distributed computer systems, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by a processing device, one or more application performance monitoring (APM) rules, each APM rule determining an operational status of a software application based on one or more APM parameters;
    identifying a plurality of functional points of the software application, wherein a first operational status of a first functional point of the plurality of functional points is independent of a second operational status of a second functional point of the plurality of functional points;
    receiving APM data comprising a plurality of APM data items representing values of the APM parameters of the software application;
    determining a plurality of operational statuses of the plurality of functional points of the software application by applying the APM rules to the APM data; and
    causing the plurality of operational statuses to be visually represented via a graphical user interface (GUI).

2. The method of claim 1, wherein at least one APM data item is received from an APM agent configured to perform active application testing.

3. The method of claim 1, wherein at least one APM data item is received from a device configured to intercept network traffic.

4. The method of claim 1, wherein at least one APM data item comprises an application response message associated with a client request message originated by a client computer system.

5. The method of claim 1, wherein determining an operational status of the plurality of operational statuses comprises characterizing the operational status as "normal" responsive to determining that an average application response time does not exceed a first threshold value.

6. The method of claim 1, wherein determining an operational status of the plurality of operational statuses comprises characterizing the operational status as "slow performing" responsive to determining that an average application response time exceeds a second threshold value.

7. The method of claim 1 wherein determining an operational status of the plurality of operational statuses comprises characterizing the operational status as "application error" responsive to detecting a certain byte pattern within at least one APM data item.

8. The method of claim 1, wherein determining an operational status of the plurality of operational statuses comprises characterizing the operational status as "critical error" responsive to detecting at least a certain number of errors associated with a certain application functional point within a certain period of time.

9. The method of claim 1, wherein determining an operational status of the plurality of operational statuses comprises characterizing the operational status as "no data available" responsive to determining that no APM data items have been received for the application within a certain period of time.

10. The method of claim 1, wherein determining an operational status of the plurality of operational statuses comprises characterizing the operational status as "service not available" responsive to determining that one or more APM data items indicate at least a certain number of failed attempts to perform a certain application function.

11. The method of claim 1, further comprising causing a plurality of operational status values corresponding to a plurality of periods of time to be visually represented in a visual relationship to a timeline.

12. The method of claim 1, wherein determining an operational status of the plurality of operational statuses comprises applying a filtering logic to prevent false positive error identification with respect to transactions associated with a user account employed by an automated testing process.

13. A system comprising:
    a memory; and
    a processing device, coupled to the memory, wherein the processing device is configured to:

receive one or more application performance monitoring (APM) rules, each APM rule determining an operational status of a software application based on one or more APM parameters;

identify a plurality of functional points of the software application, wherein a first operational status of a first functional point of the plurality of functional points is independent of a second operational status of a second functional point of the plurality of functional points;

receive APM data comprising a plurality of APM data items representing values of the APM parameters of the software application;

determine a plurality of operational statuses of the plurality of functional points of the software application by applying the APM rules to the APM data; and cause the plurality of operational statuses to be visually represented via a graphical user interface (GUI).

14. The system of claim 13, wherein determining an operational status of the plurality of operational statuses comprises characterizing the operational status as "normal" responsive to determining that an average application response time does not exceed a first threshold value.

15. The system of claim 13, wherein determining an operational status of the plurality of operational statuses comprises characterizing the operational status as "slow performing" responsive to determining that an average application response time exceeds a second threshold value.

16. The system of claim 13, wherein determining an operational status of the plurality of operational statuses comprises characterizing the operational status as "application error" responsive to detecting a certain byte pattern within at least one APM data item.

17. The system of claim 13, wherein determining an operational status of the plurality of operational statuses comprises characterizing the operational status as "critical error" responsive to detecting at least a certain number of errors associated with a certain application functional point within a certain period of time.

18. The system of claim 13, wherein determining an operational status of the plurality of operational statuses comprises characterizing the operational status as "no data available" responsive to determining that no APM data items have been received for the application within a certain period of time.

19. The system of claim 13, wherein determining an operational status of the plurality of operational statuses comprises characterizing the operational status as "service not available" responsive to determining that one or more APM data items indicate at least a certain number of failed attempts to perform a certain application function.

20. A computer-readable non-transitory storage medium comprising executable instructions that, when executed by a first computer system, cause the computer system to perform operations comprising:

receiving one or more application performance monitoring (APM) rules, each APM rule determining an operational status of a software application based on one or more APM parameters;

identifying a plurality of functional points of the software application, wherein a first operational status of a first functional point of the plurality of functional points is independent of a second operational status of a second functional point of the plurality of functional points;

receiving APM data comprising a plurality of APM data items representing values of the APM parameters of the software application;

determining a plurality of operational statuses of the plurality of functional points of the software application by applying the APM rules to the APM data; and causing the plurality of operational statuses to be visually represented via a graphical user interface (GUI).

* * * * *